(12) United States Patent
Graham et al.

(10) Patent No.: US 8,402,553 B2
(45) Date of Patent: Mar. 19, 2013

(54) UPDATING AN OPERATING SYSTEM OF A COMPUTER SYSTEM

(75) Inventors: Jon E. Graham, San Jose, CA (US); Anurag Sharma, Mountain View, CA (US); Steven Welch, Gilroy, CA (US)

(73) Assignee: International Business Machines Corporation, Armonk, NY (US)

( * ) Notice: Subject to any disclaimer, the term of this patent is extended or adjusted under 35 U.S.C. 154(b) by 543 days.

(21) Appl. No.: 12/609,186

(22) Filed: Oct. 30, 2009

(65) Prior Publication Data

US 2011/0107430 A1    May 5, 2011

(51) Int. Cl.
    *G06F 7/04*      (2006.01)
(52) U.S. Cl. ............................ 726/27; 713/100; 717/168
(58) Field of Classification Search ................... 726/27; 713/100; 717/168
See application file for complete search history.

(56) References Cited

U.S. PATENT DOCUMENTS

| | | |
|---|---|---|
| 7,290,266 B2 | 10/2007 | Gladstone |
| 2002/0157010 A1 | 10/2002 | Dayan |
| 2006/0150256 A1 | 7/2006 | Fanton |
| 2007/0150874 A1 | 6/2007 | Sharma |
| 2007/0150956 A1 | 6/2007 | Sharma |
| 2009/0178103 A1 | 7/2009 | Graham |

OTHER PUBLICATIONS

Roberts, et al: "IBM Lotus Expeditor restricted workbench: The lockdown service and associated native function", Sep. 18, 2007, 17 pages.
"You encounter unexpected behavior when you perform tasks as a standard user and the User Account Control feature is disabled in Windows Vista", http://support.microsoft.com/kb/928497, Microsoft 2009, 2 pages.
"Application Control and Device Control Products", http://www.bit9.com/products/parity-works.php, Bit9, Inc., 2009, 2 pages.
"Microsoft Application Virtualization 4.5 Release to Manufacturing", http://www.microsoft.com/systemcenter/softgrid/default.mspx?PHPSESSID=e80f23e82bb4721ba8952607b03fcbfa, Microsoft Corporation, 2009, United States, 3 pages.

*Primary Examiner* — April Shan
(74) *Attorney, Agent, or Firm* — Leonard T. Guzman; Mohammed Kashef

(57) ABSTRACT

The present invention provides a processor-implemented method and system of updating an operating system of a computer system, where the operating system is subject to a system lockdown that does not allow changes to a list of approved executables of the operating system and that does not allow changes to a base system configuration of the operating system. In an exemplary embodiment, the method and system include, (1) identifying at least one trusted updater process in the operating system and (2) allowing the trusted updater process to make at least one change to the list of approved executables. In an exemplary embodiment, the method and system include, (1) identifying at least one trusted updater process in the operating system and (2) allowing the trusted updater process to make at least one change to the base system configuration.

25 Claims, 19 Drawing Sheets

UPDATING AN OPERATING SYSTEM OF A COMPUTER SYSTEM

FIELD OF THE INVENTION

The present invention relates to computer systems, and particularly relates to a processor-implemented method and system of updating an operating system of a computer system.

BACKGROUND OF THE INVENTION

A system lockdown for an operating system of a computer system may be weak lockdown or a strong lockdown. A weak lockdown for has the property that only approved executable computer files are allowed to execute on the system. A strong lockdown has the following properties: (i) only approved executable computer files are allowed to execute on the system, (ii) changes to approved executable computer files are not allowed, and (iii) changes to the base system configuration of the operating system are prevented. The base system configuration includes system-service settings such as a list of drivers that are loaded during system boot. If this list were to be corrupted, then the system could effectively be prevented from booting.
Strong Lockdown Current computer software vendors prefer to implement weak lockdown over strong lockdown, because strong lockdown prevents applications and system components from being updated using existing methods. This is because approved files and the base system configuration cannot change under strong lockdown policies.
Weak Lockdown A weak lockdown, on the other hand, allows application updates to occur (since it allows overwriting of all computer files on the system), and then checks if the newly updated executable files are still approved by a global authorization entity (e.g., a global approval server that contains a list of checksums of computer files that are approved by the systems administrator.

While a weak lockdown interferes less with existing application behavior and usage patterns, it also provides a decreased amount of security, since it leaves the system open to the several attacks. For example, a weak lockdown leaves the system vulnerable to a denial of service attack entailing over-writing approved computer software applications running on the system. In addition, a weak lockdown leaves the system vulnerable to a denial of service attack entailing over-writing the base system configuration of the operating system.
Prior Art Systems One prior art system, in Microsoft Corporation's Windows Vista operating system, is a user account control (UAC) system. The UAC reduces the privilege under which user-programs normally run. The UAC reduces the attack-surface on an operating system's trusted-computing-base by preventing attacks on approved executable computer files and the base system configuration of the system. However, the UAC still lets malicious code to execute (albeit in lower-privilege) and attack the user's data, since Vista does not categorize the modification of a user's data as a high-privilege operation. Thus, with UAC, Vista would allow a malware executable ton run and capture a user's web passwords, or compromise the user's private data.

Referring to FIG. 1, a prior art system includes using a trusted agent to make changes to the approved executable computer files and base system configuration of a computer system. As depicted in FIG. 1, this prior art system includes (1) recording in a sand-boxed environment all the changes a particular application updater or installer would make to the computer file system and registry of the computer system and (2) moving these changes to the strongly locked down system by using a trusted agent at a later time. However, this prior arty system has application and system compatibility issues where the set of changes recorded in a sand-boxed environment may not work properly when placed on target systems. In addition, this prior art system is complex and places an additional preparation burden on the computer infrastructure of the computer system.

Therefore, a method and system of updating an operating system of a computer system, where the operating system is subject to a system lockdown that does not allow changes to a list of approved executables of the operating system and that does not allow changes to a base system configuration of the operating system, is needed.

SUMMARY OF THE INVENTION

The present invention provides a processor-implemented method and system of updating an operating system of a computer system, where the operating system is subject to a system lockdown that does not allow changes to a list of approved executables of the operating system and that does not allow changes to a base system configuration of the operating system. In an exemplary embodiment, the method and system include, (1) identifying at least one trusted updater process in the operating system and (2) allowing the trusted updater process to make at least one change to the list of approved executables. In an exemplary embodiment, the method and system include, (1) identifying at least one trusted updater process in the operating system and (2) allowing the trusted updater process to make at least one change to the base system configuration. In an exemplary embodiment, the present invention further includes validating the allowing.

In an exemplary embodiment, the identifying includes identifying the process as a trusted updater if the executable file of the process is identified as a trusted updater. In an exemplary embodiment, the identifying includes identifying the process as a trusted updater if the process runs in the local-system account of the operating system. In an exemplary embodiment, the identifying includes identifying the process as a trusted updater if the process performs at least one kernel-mode write access.

In an exemplary embodiment, the allowing includes (a) tracking each instance of the trusted updater process and each child-process spawned by the trusted updater process and (b) identifying the spawned child-process as a trusted updater. In an exemplary embodiment, the allowing further includes allowing the trusted updater process to write to at least one of the approved executables. In an exemplary embodiment, the allowing further includes allowing the trusted updater process to write to at least one of the approved executables. In an exemplary embodiment, the allowing further includes, for each file created by the trusted updater process, if the file is an executable file, adding the file to the list of approved executables.

In an exemplary embodiment, the allowing further includes allowing the trusted updater process to delete at least one of the approved executables. In an exemplary embodiment, the allowing further includes allowing the trusted updater process to write to the base system configuration.

The present invention also provides a computer program product usable with a programmable computer having readable program code embodied therein of updating an operating system of a computer system, where the operating system is subject to a system lockdown that does not allow changes to a list of approved executables of the operating system and that does not allow changes to a base system configuration of the operating system. In an exemplary embodiment, the computer program product includes (1) computer readable code for identifying at least one trusted updater process in the operating system and (2) computer readable code for allowing the trusted updater process to make at least one change to the list of approved executables.

THE FIGURES

DETAILED DESCRIPTION OF THE INVENTION

The present invention provides a processor-implemented method and system of updating an operating system of a computer system, where the operating system is subject to a system lockdown that does not allow changes to a list of approved executables of the operating system and that does not allow changes to a base system configuration of the operating system. In an exemplary embodiment, the method and system include, (1) identifying at least one trusted updater process in the operating system and (2) allowing the trusted updater process to make at least one change to the list of approved executables. In an exemplary embodiment, the method and system include, (1) identifying at least one trusted updater process in the operating system and (2) allowing the trusted updater process to make at least one change to the base system configuration.

Updating the List of Approved Executables

Figure 1:
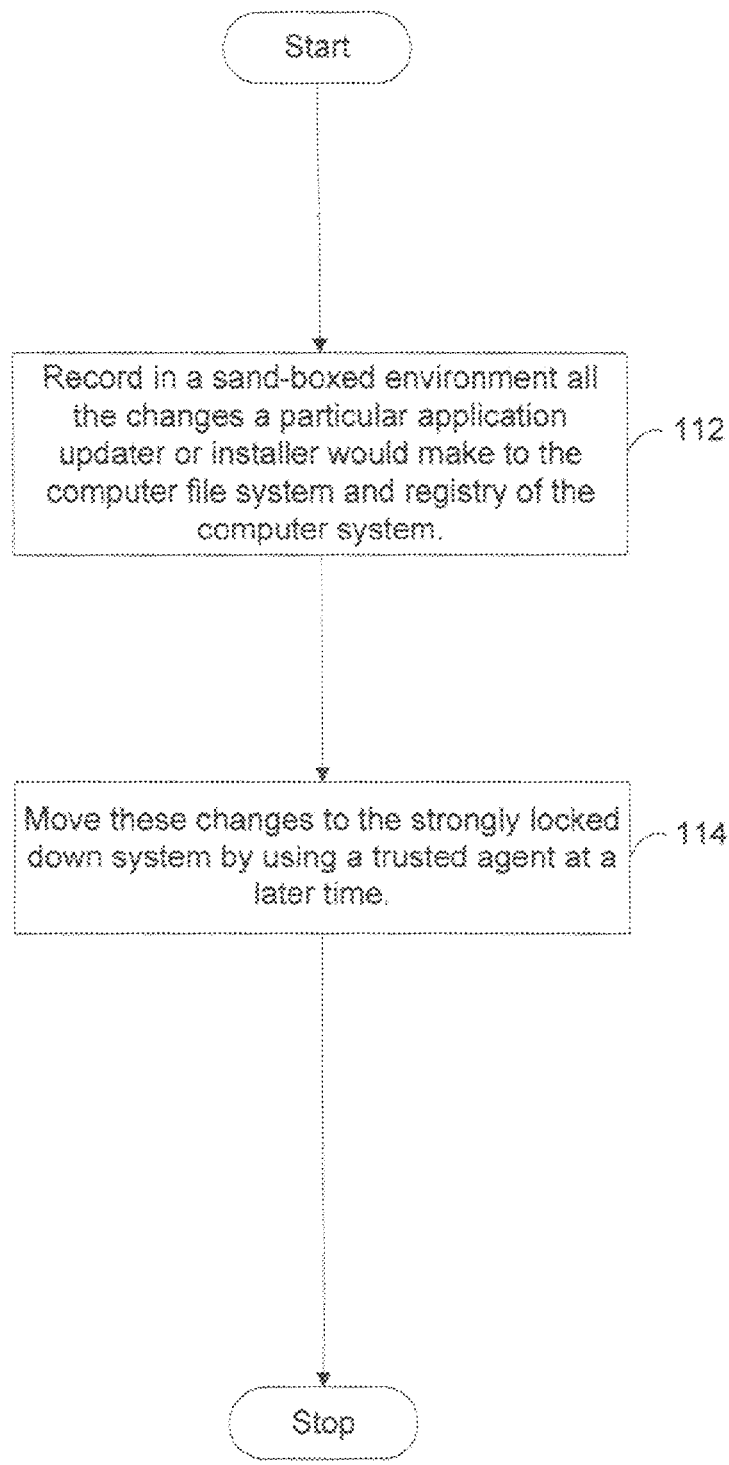
FIG. 1 is a flowchart of a prior art technique.
Figure 2A:
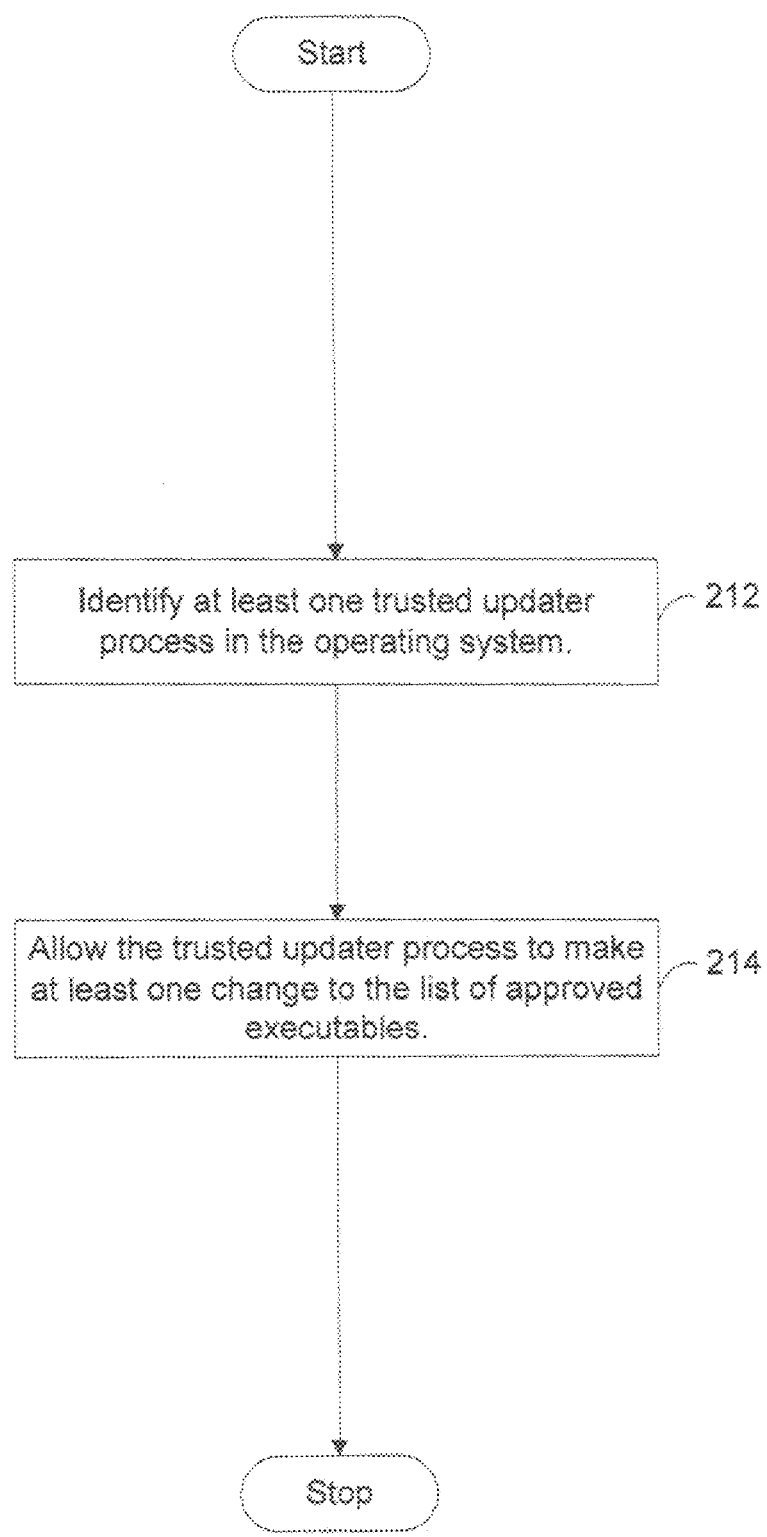
FIG. 2A is a flowchart in accordance with an exemplary embodiment of the present invention.
Figure 2B:
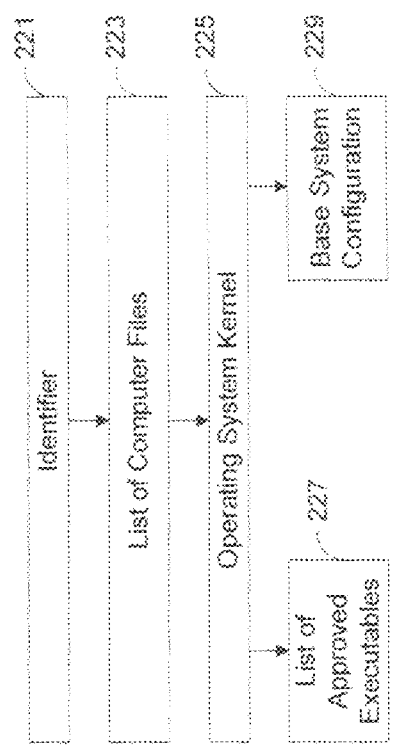
FIG. 2B is a diagram in accordance with an exemplary embodiment of the present invention.
Figure 2C:
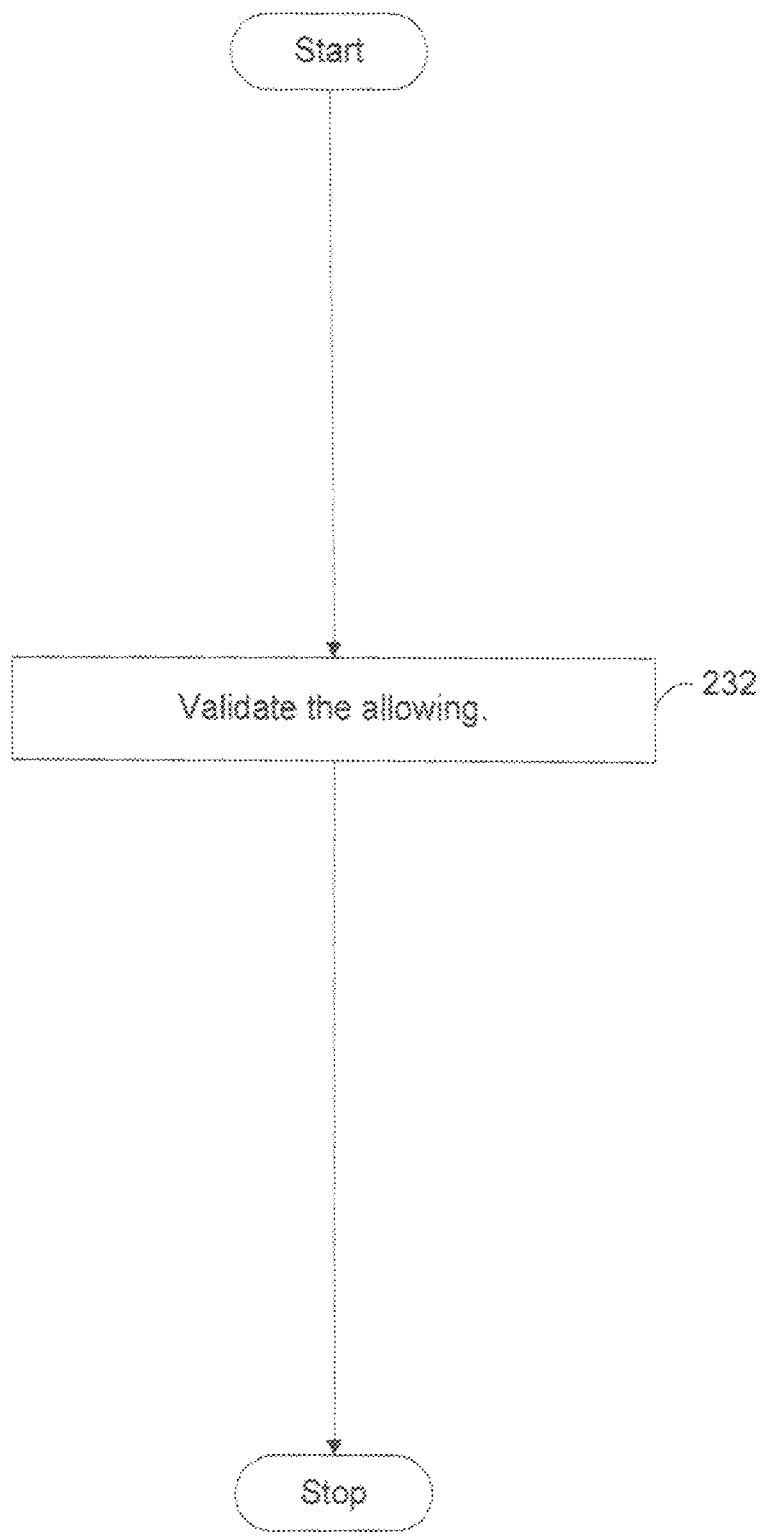
FIG. 2C is a flowchart in accordance with an exemplary embodiment of the present invention.

Referring to FIG. 2A, in an exemplary embodiment, the present invention includes a step 212 of identifying at least one trusted updater process in the operating system and a step 214 of allowing the trusted updater process to make at least one change to the list of approved executables. Referring to FIG. 2B, in an exemplary embodiment, the present invention includes an identifier 221, a list of computer files 223, an operating system kernel 225, a list of approved executables 227, and a base system configuration 229. In an exemplary embodiment, identifier 221 identifies at least one trusted updater process in list of computer files 223 in the operating system. When operating system kernel 225 retrieves the trusted updater process from list of computer files 223, kernel 225 (i) may allow the trusted updater process to make at least one change to list of approved executables 227 and/or (ii) may allow the trusted updater process to make at least one change to base system configuration 229. Referring to FIG. 2C, in an exemplary embodiment, the present invention further includes a step 232 of validating allowing step 214. In an exemplary embodiment, validating step 232 includes monitoring the computer file-system of the computer system by extending the file monitoring functionality of the lockdown. In the Vista operating system, the extending includes implementing a File-System Mini-Filter.

Identifying

Figure 3A:
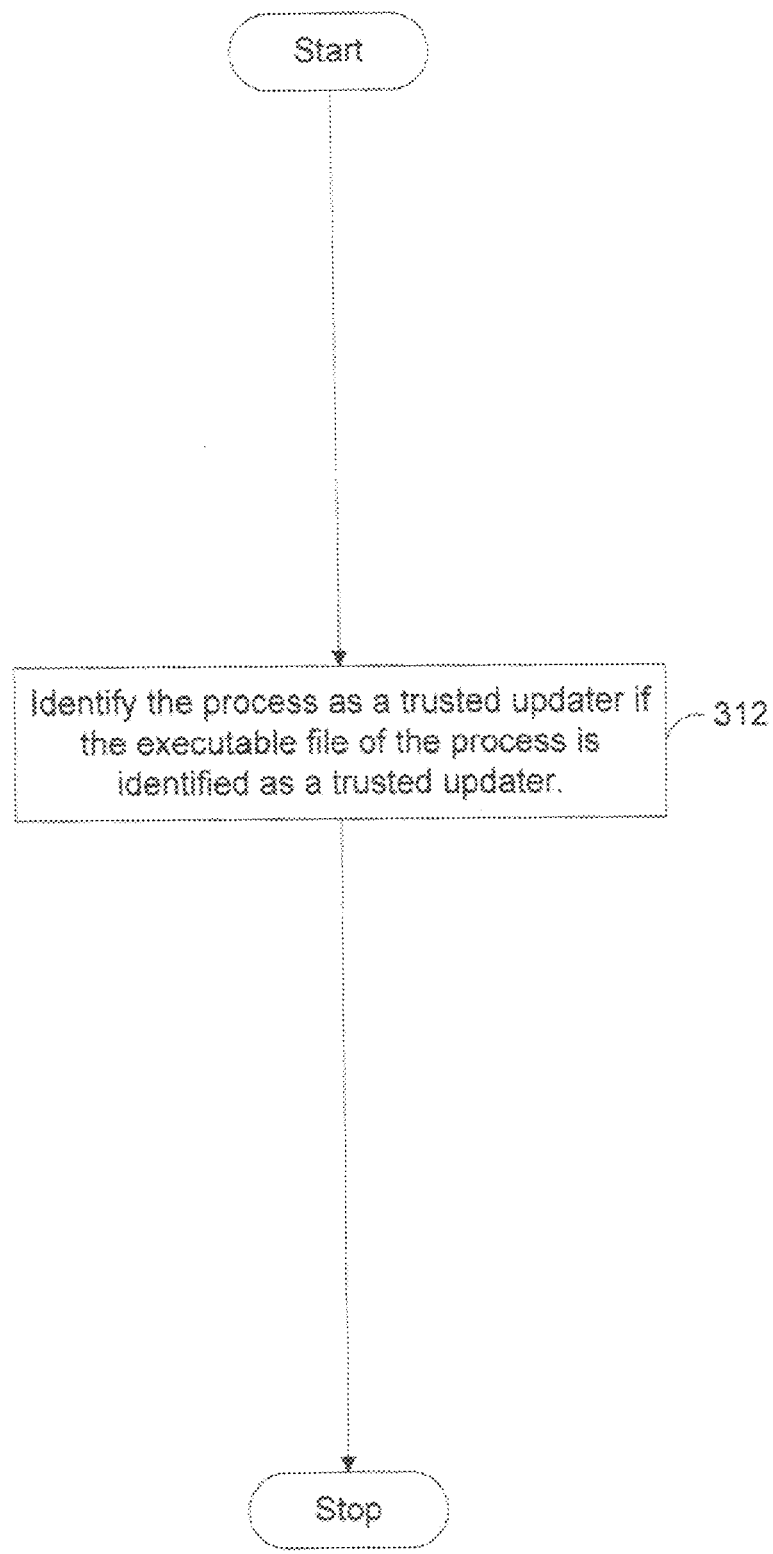
FIG. 3A is a flowchart of the identifying step in accordance with an exemplary embodiment of the present invention.

Referring to FIG. 3A, in an exemplary embodiment, identifying step 212 includes a step 312 of identifying the process as a trusted updater if the executable file of the process is identified as a trusted updater. For example, identifying step 312 could entail an administrator of the computer system tagging the executable file of the process as a trusted updater. The tagging would be allowed if another computer software application running on the computer system were to have custom update functionality.

Figure 3B:
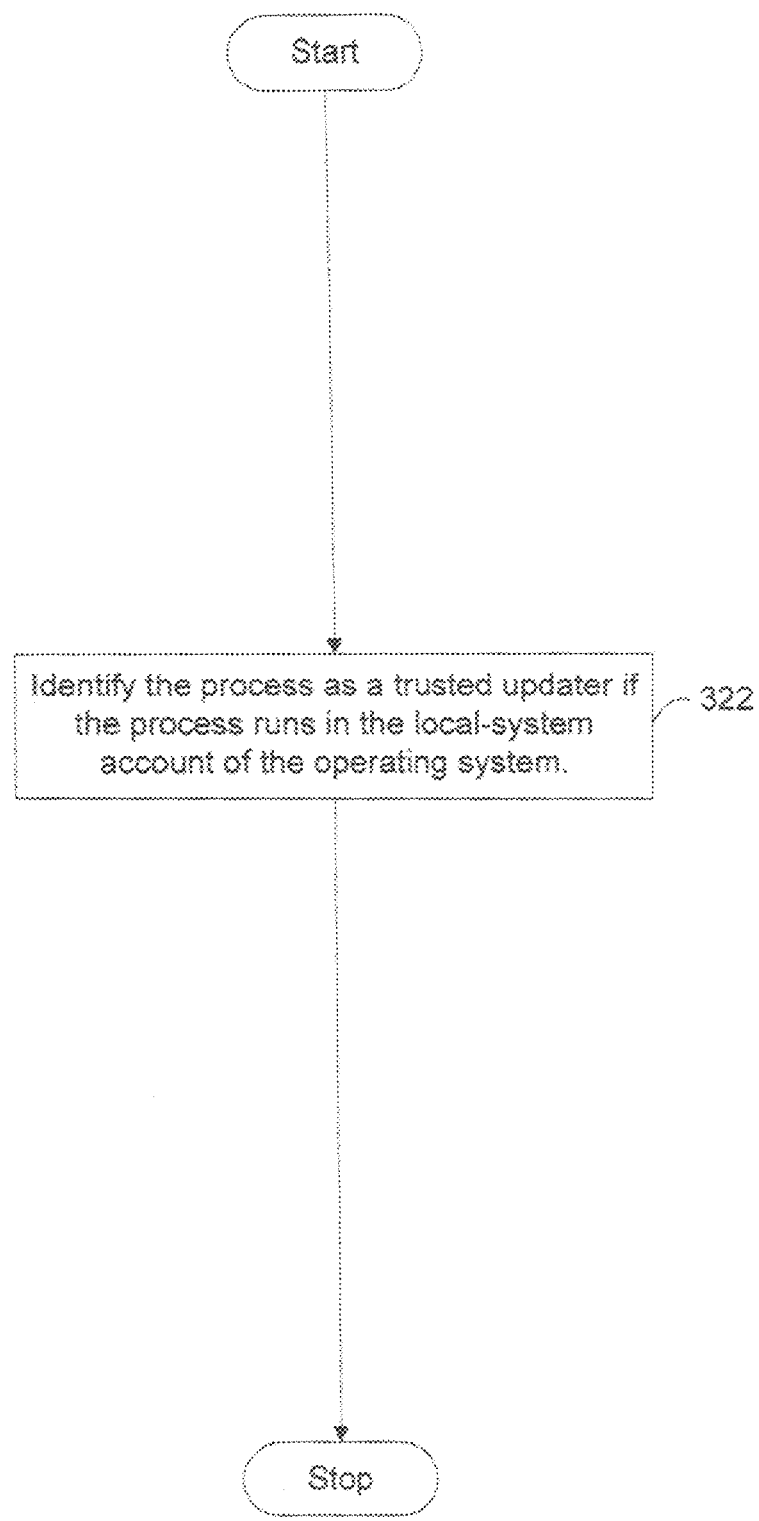
FIG. 3B is a flowchart of the identifying step in accordance with an exemplary embodiment of the present invention.

Referring to FIG. 3B, in an exemplary embodiment, identifying step 212 includes a step 322 of identifying the process as a trusted updater if the process runs in the local-system account of the operating system. For example, identifying step 322 could operate if the process were a system update infrastructure, such as the Windows Update infrastructure in the Microsoft Windows operating system. Also, identifying step 322 could apply if the process were another computer software application running on the computer system, where the application uses system-services of the operating system to perform updates, such as the Windows Installer service in the Microsoft Windows operating system.

Figure 3C:
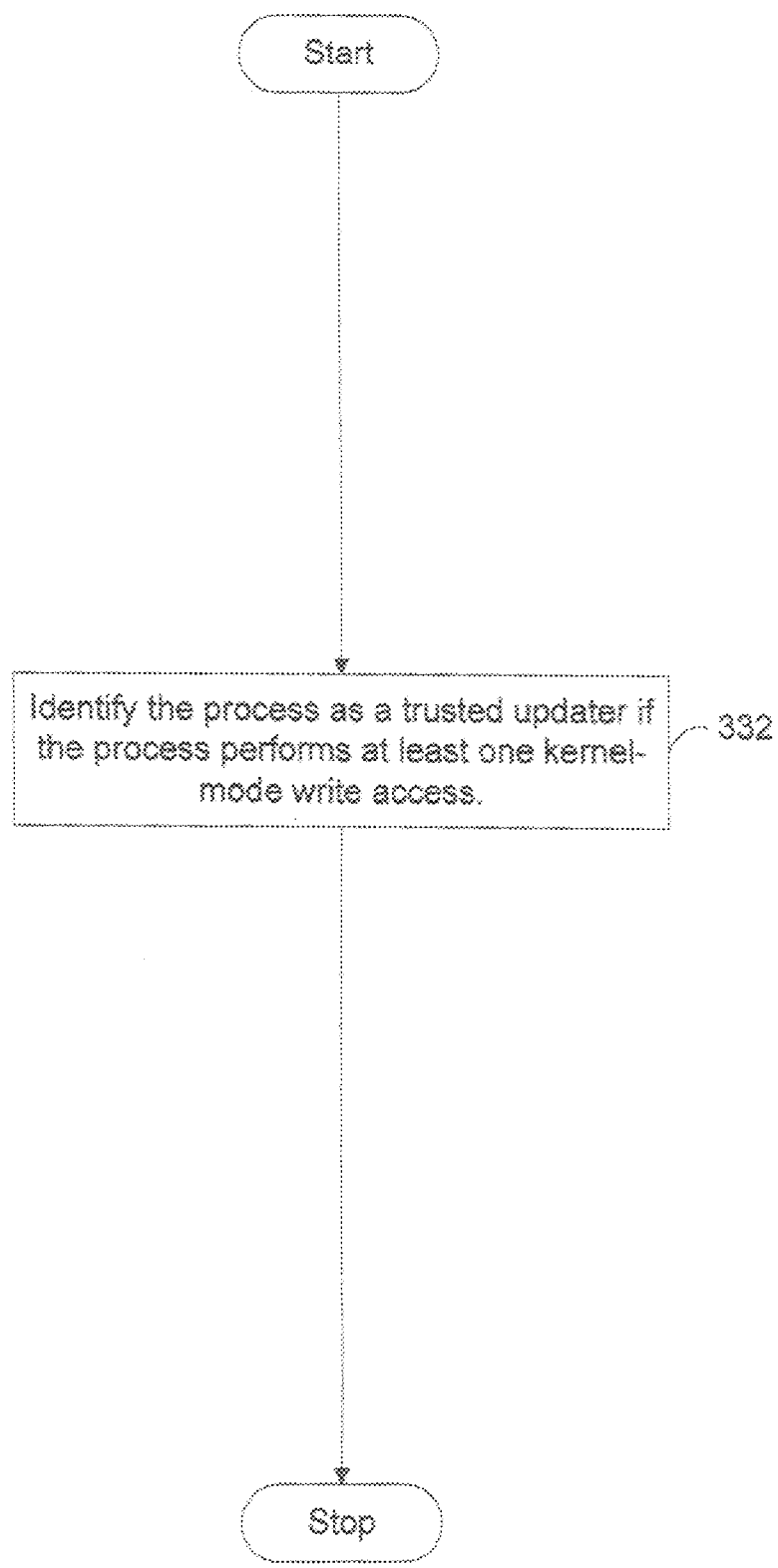
FIG. 3C is a flowchart of the identifying step in accordance with an exemplary embodiment of the present invention.

Referring to FIG. 3C, in an exemplary embodiment, identifying step 212 includes a step 332 of identifying the process as a trusted updater if the process performs at least one kernel-mode write access. For example, identifying step 332 could operate if the process were another computer software application running on the computer system, where the application runs a portion of its update functionality in the kernel, such as computer anti-virus computer software.

Allowing

Figure 4:
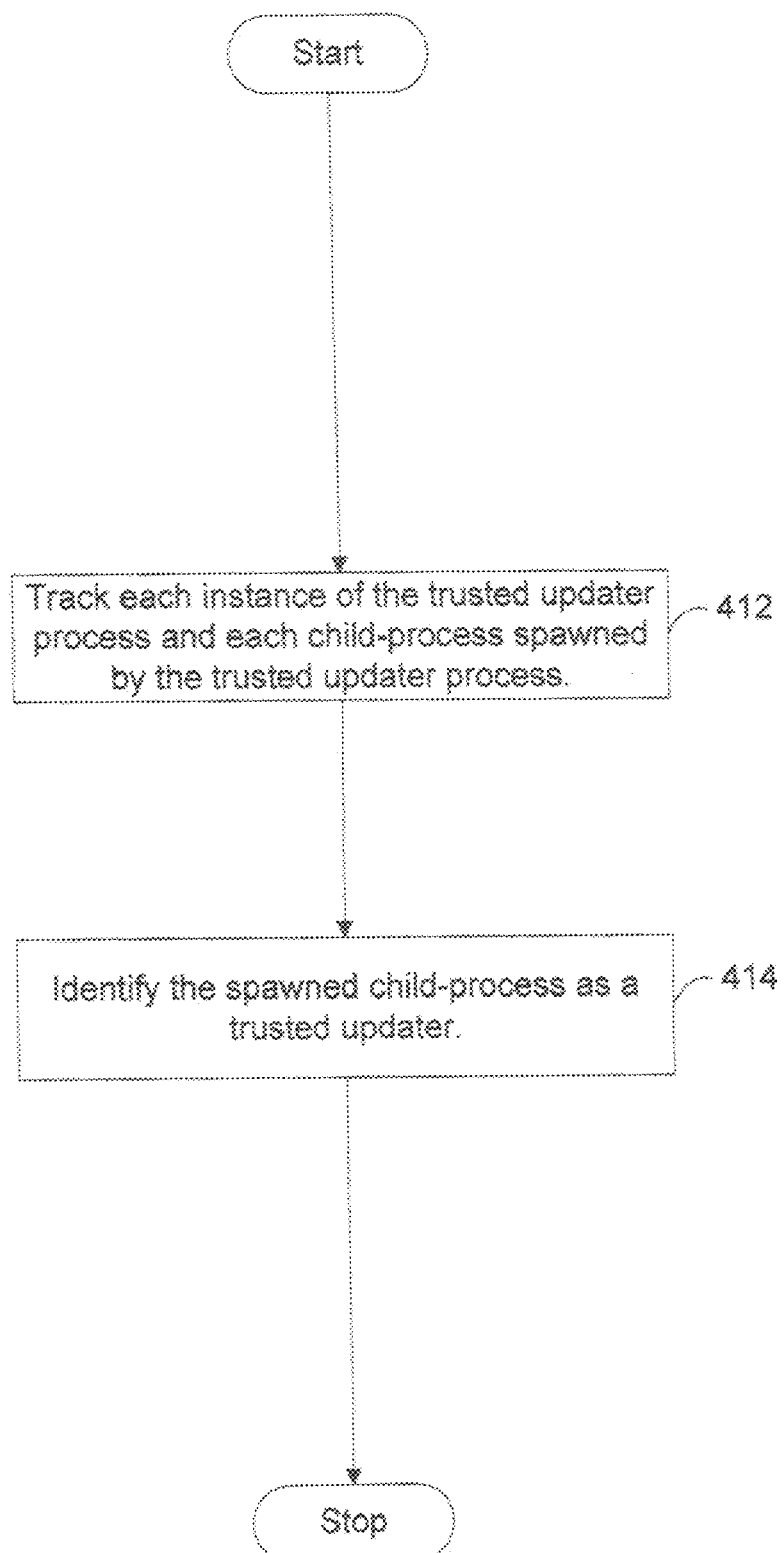
FIG. 4 is a flowchart of the allowing step in accordance with an exemplary embodiment of the present invention.

Referring to FIG. 4, in an exemplary embodiment, allowing step 214 includes a step 412 of tracking each instance of the trusted updater process and each child-process spawned by the trusted updater process and 414 of identifying the spawned child-process as a trusted updater. In an exemplary embodiment, tracking step 412 includes (a) using techniques described in commonly-owned, U.S. patent application Ser. No. 11/969,842, filed Jan. 4, 2008, and (b) monitoring the process tree of the operating system. In an exemplary embodiment, allowing step 214 considers (i) a target object path, (ii) a type of operation being performed, such as allow, deny, and add file to "approved" executables list.

Figure 5A:
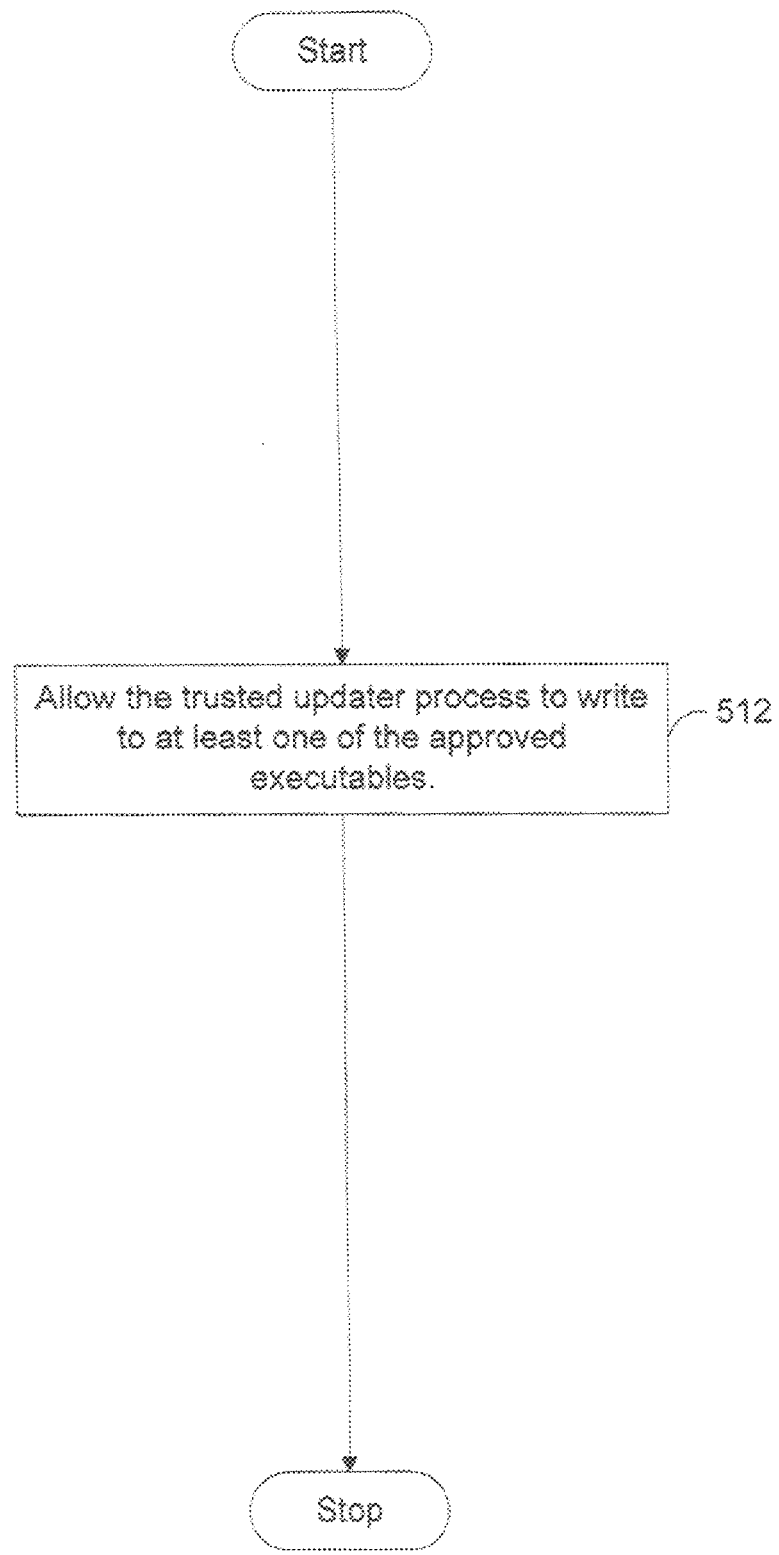
FIG. 5A is a flowchart of the allowing step in accordance with an exemplary embodiment of the present invention.
Figure 5B:
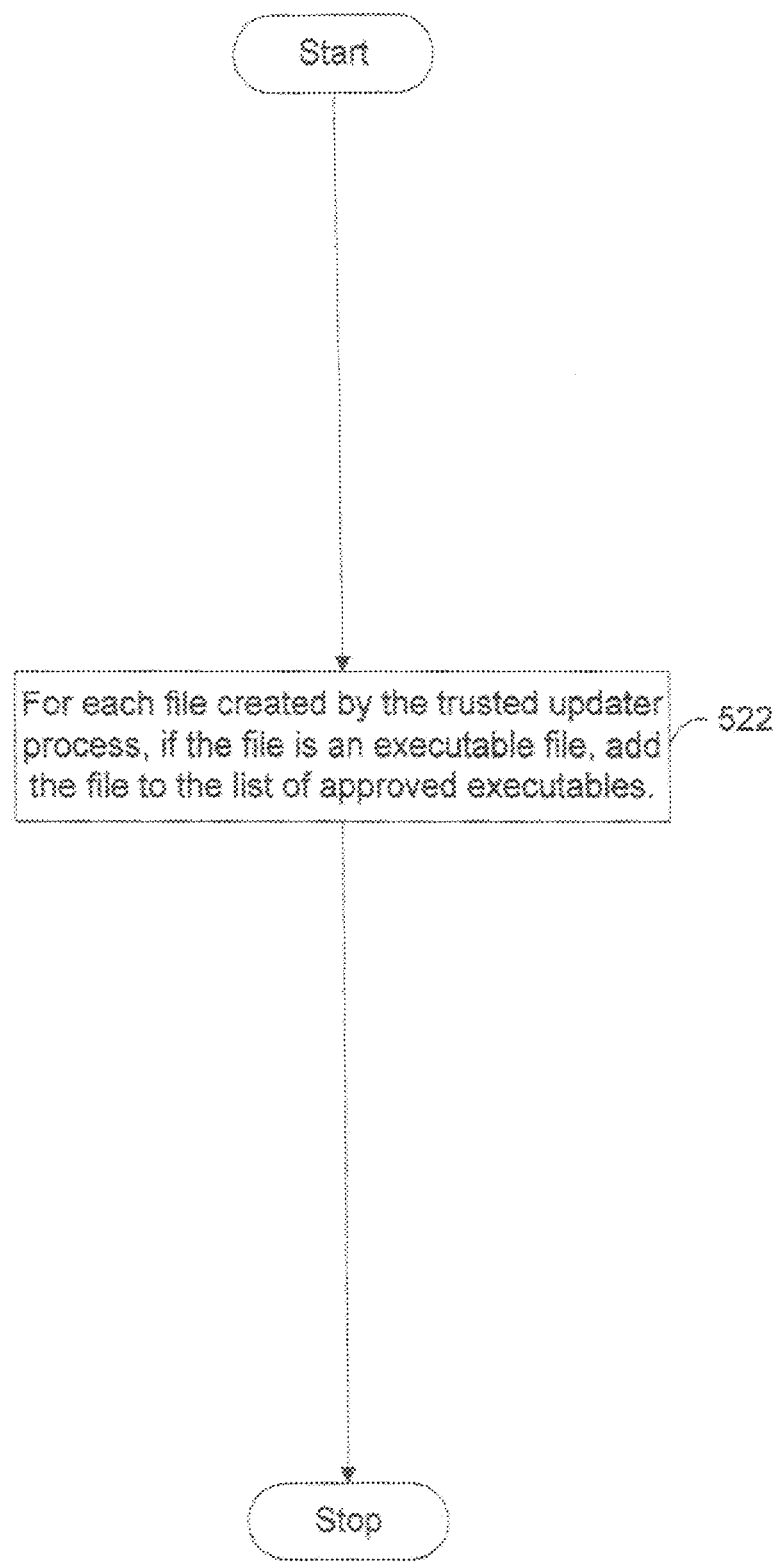
FIG. 5B is a flowchart of the allowing step in accordance with an exemplary embodiment of the present invention.
Figure 5C:
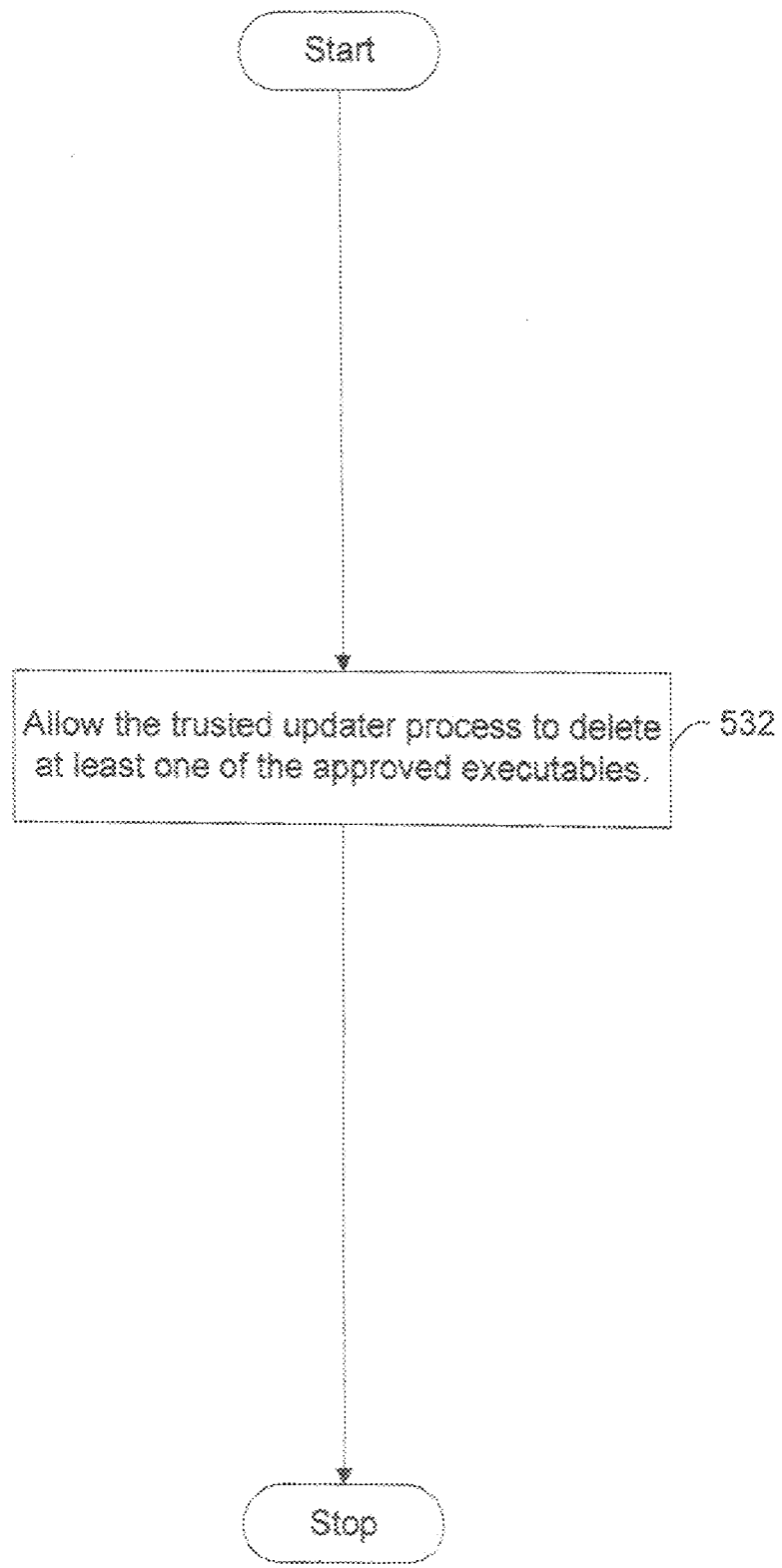
FIG. 5C is a flowchart of the allowing step in accordance with an exemplary embodiment of the present invention.

Referring to FIG. 5A, in an exemplary embodiment, allowing step 214 further includes a step 512 of allowing the trusted updater process to write to at least one of the approved executables. Referring to FIG. 5B, in an exemplary embodiment, allowing step 512 further includes a step 522 of, for each file created by the trusted updater process, if the file is an executable file, adding the file to the list of approved executables. Referring to FIG. 5C, in an exemplary embodiment, allowing step 214 further includes a step 532 of allowing the trusted updater process to delete at least one of the approved executables.

Updating the Base System Configuration

Figure 6A:
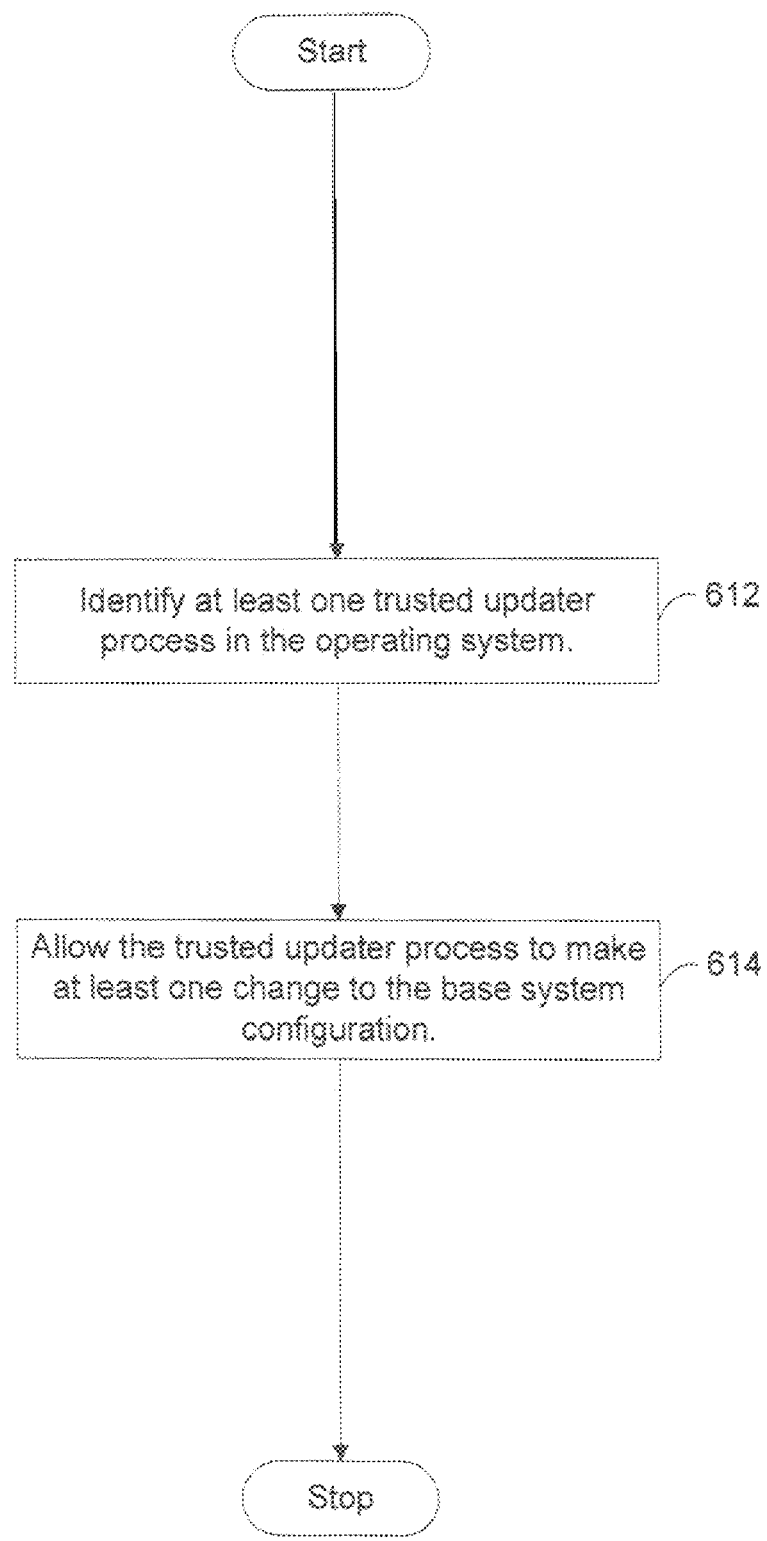
FIG. 6A is a flowchart in accordance with an exemplary embodiment of the present invention.
Figure 6B:
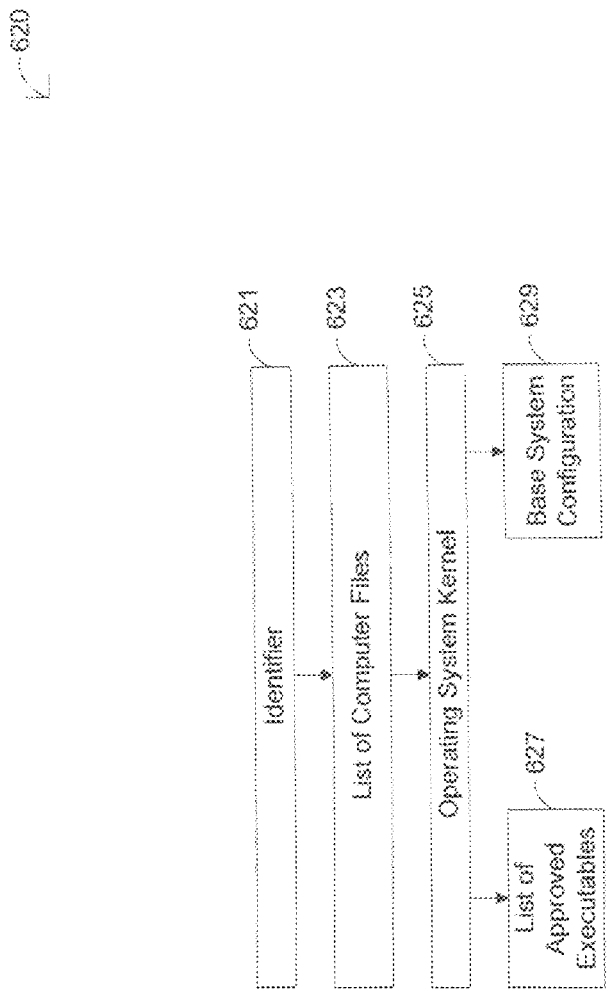
FIG. 6B is a diagram in accordance with an exemplary embodiment of the present invention.
Figure 6C:
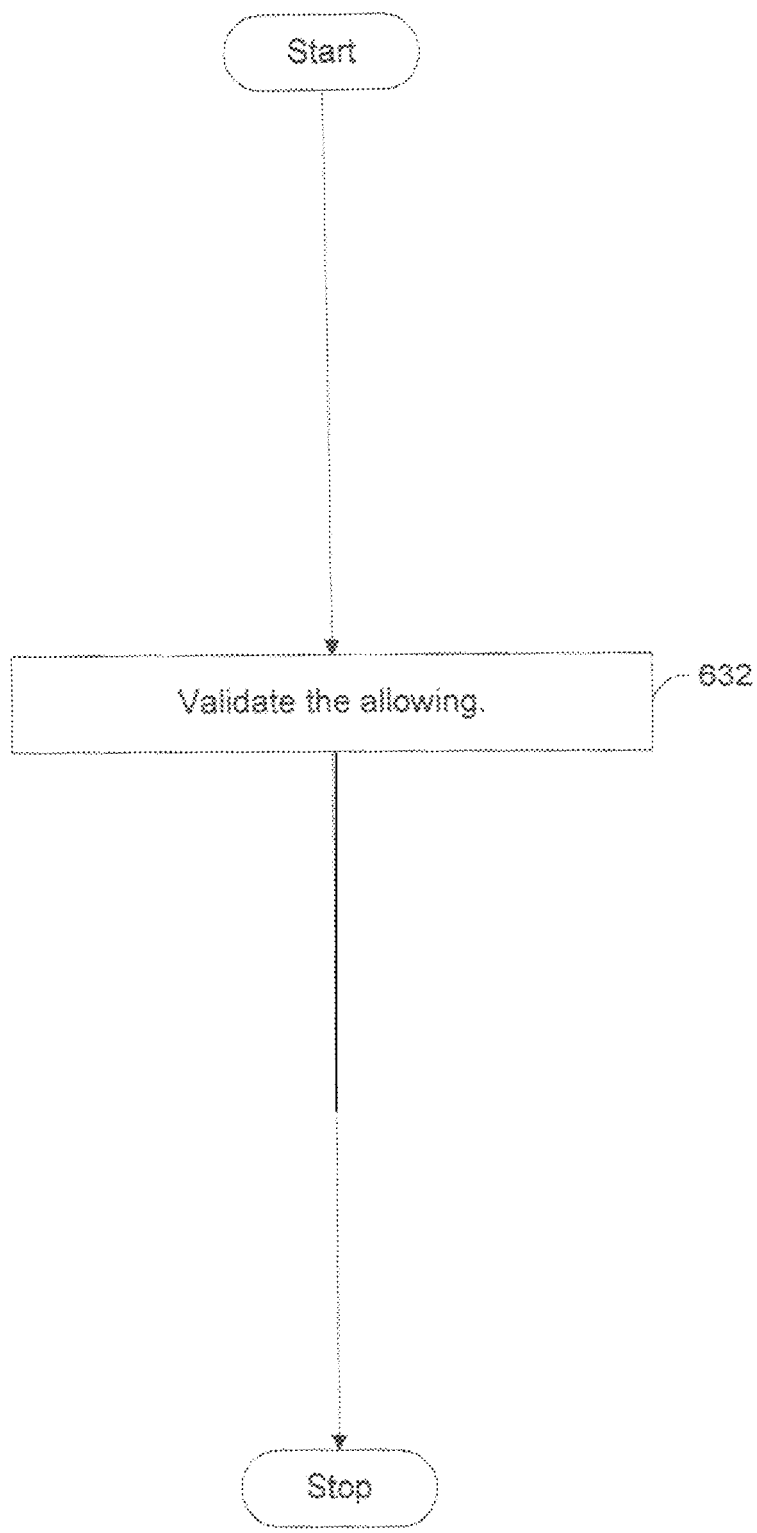
FIG. 6C is a flowchart in accordance with an exemplary embodiment of the present invention.

Referring to FIG. 6A, in an exemplary embodiment, the present invention includes a step 612 of identifying at least one trusted updater process in the operating system and a step 614 of allowing the trusted updater process to make at least one change to the base system configuration. Referring to FIG. 6B, in an exemplary embodiment, the present invention includes an identifier 621, a list of computer files 623, an operating system kernel 625, a list of approved executables 627, and a base system configuration 629. In an exemplary embodiment, identifier 621 identifies at least one trusted updater process in list of computer files 623 in the operating system. When operating system kernel 625 retrieves the trusted updater process from list of computer files 623, kernel 625 (i) may allow the trusted updater process to make at least one change to list of approved executables 627 and/or (ii) may allow the trusted updater process to make at least one change to base system configuration 629. Referring to FIG. 6C, in an exemplary embodiment, the present invention further includes a step 632 of validating allowing step 614. In an exemplary embodiment, validating step 632 includes monitoring updates to the registry of the computer system by extending the registry monitoring capability of the lockdown. In the Vista operating system, the extending includes registering the system for registry change notification via the CmRegisterCallback( ) kernel application programming interface.

Identifying

Figure 7A:
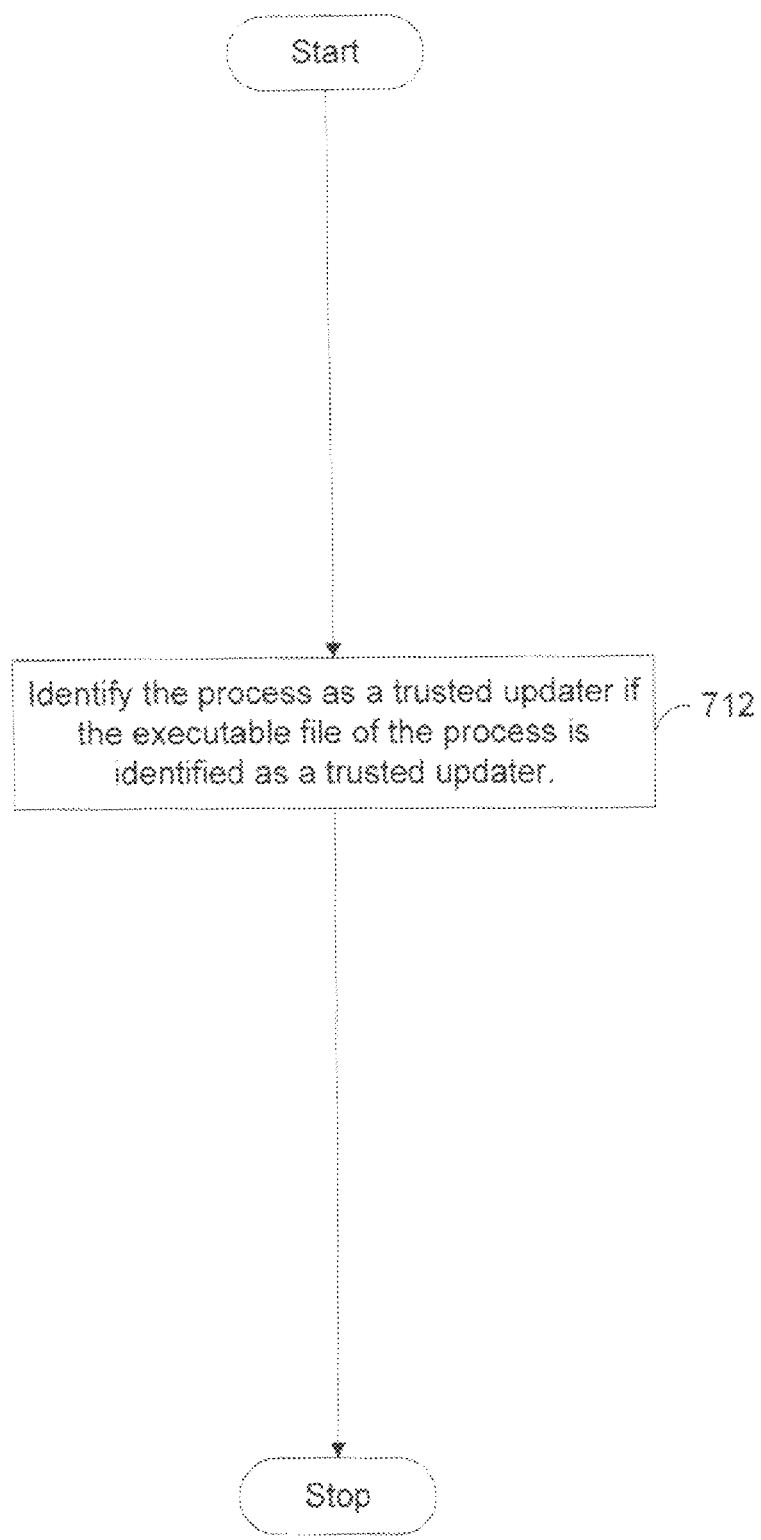
FIG. 7A is a flowchart of the identifying step in accordance with an exemplary embodiment of the present invention.

Referring to FIG. 7A, in an exemplary embodiment, identifying step 612 includes a step 712 of identifying the process as a trusted updater if the executable file of the process is identified as a trusted updater. For example, identifying step 712 could entail an administrator of the computer system tagging the executable file of the process as a trusted updater. The tagging would be allowed if another computer software application running on the computer system were to have custom update functionality.

Figure 7B:
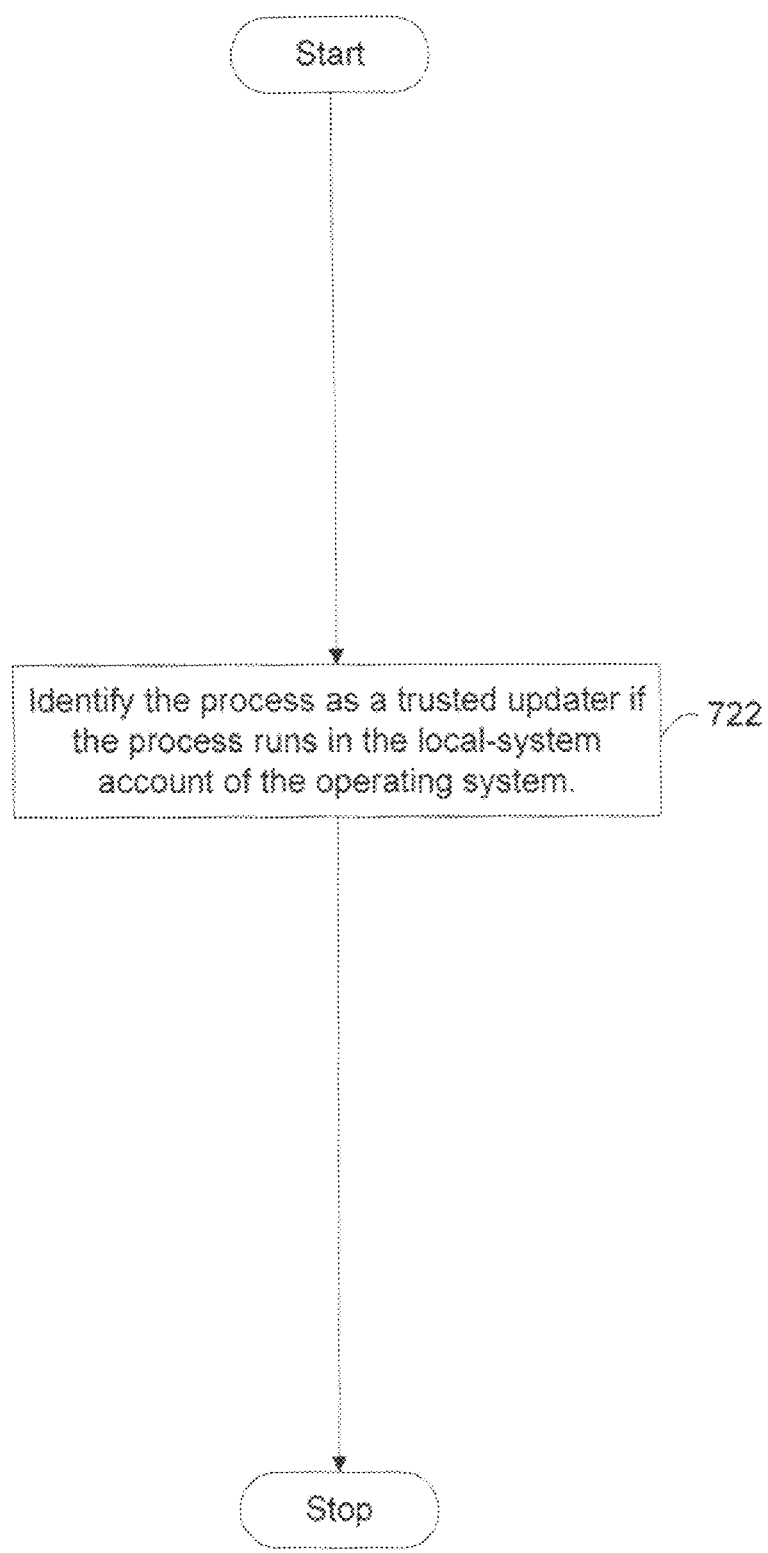
FIG. 7B is a flowchart of the identifying step in accordance with an exemplary embodiment of the present invention.

Referring to FIG. 7B, in an exemplary embodiment, identifying step 612 includes a step 722 of identifying the process as a trusted updater if the process runs in the local-system account of the operating system. For example, identifying step 722 could operate if the process were a system update infrastructure, such as the Windows Update infrastructure in the Microsoft Windows operating system. Also, identifying step 722 could apply if the process were another computer software application running on the computer system, where the application uses system-services of the operating system to perform updates, such as the Windows Installer service in the Microsoft Windows operating system.

Figure 7C:
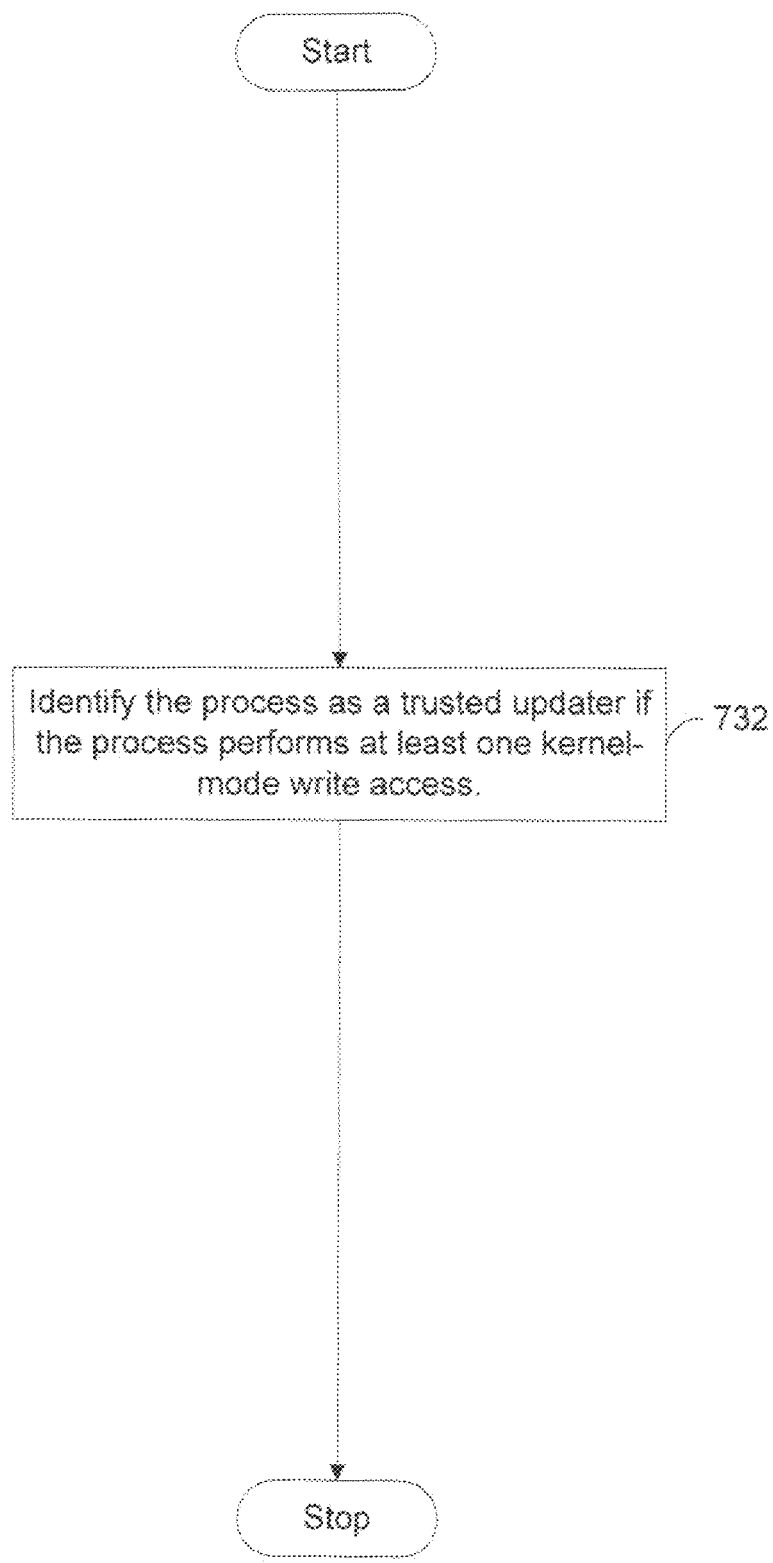
FIG. 7C is a flowchart of the identifying step in accordance with an exemplary embodiment of the present invention.

Referring to FIG. 7C, in an exemplary embodiment, identifying step 612 includes a step 732 of identifying the process as a trusted updater if the process performs at least one kernel-mode write access. For example, identifying step 732 could operate if the process were another computer software application running on the computer system, where the application runs a portion of its update functionality in the kernel, such as computer anti-virus computer software.

Allowing

Figure 8:
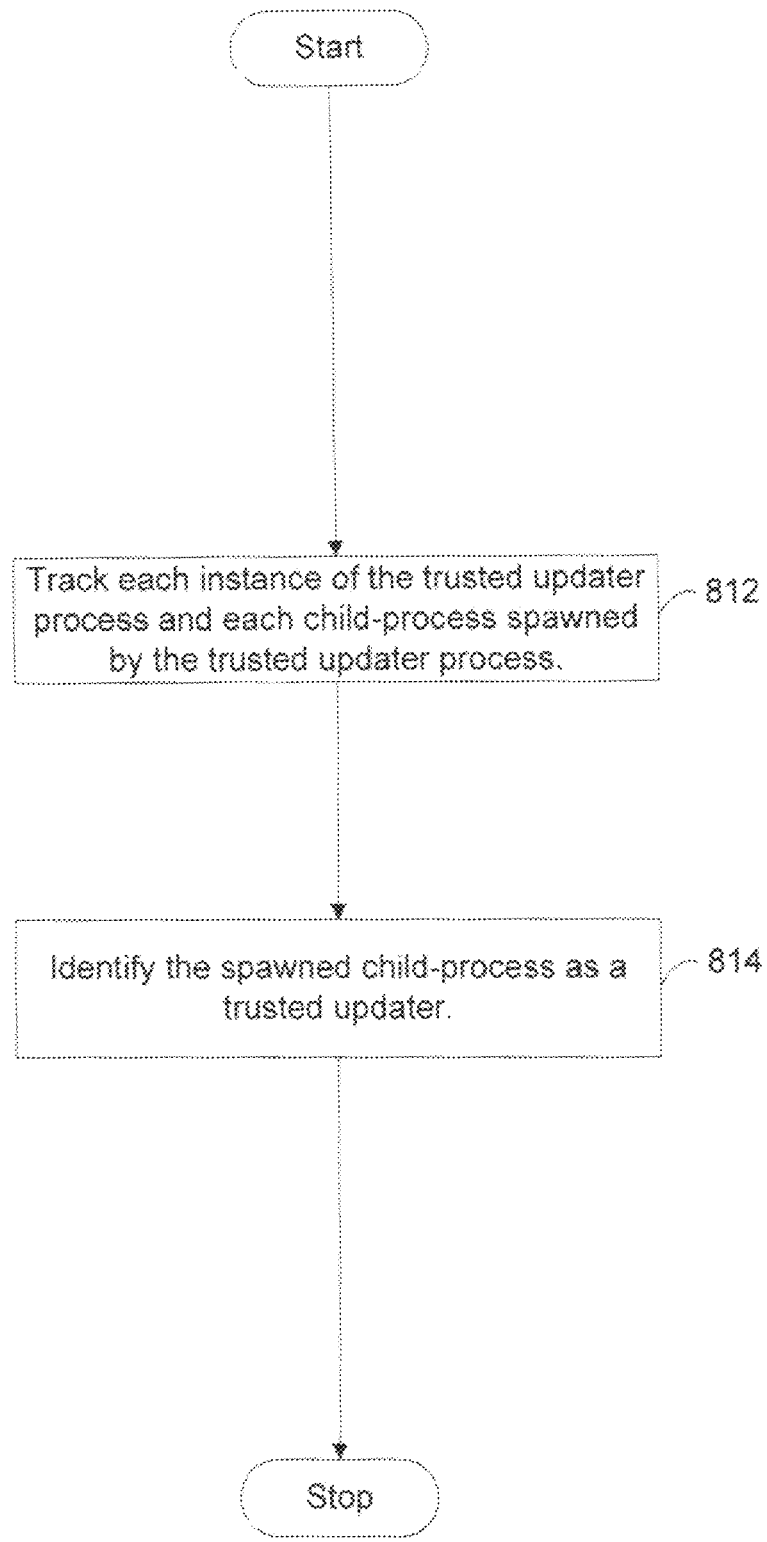
FIG. 8 is a flowchart of the allowing step in accordance with an exemplary embodiment of the present invention.

Referring to FIG. 8, in an exemplary embodiment, allowing step 614 includes a step 812 of tracking each instance of the trusted updater process and each child-process spawned by the trusted updater process and 814 of identifying the spawned child-process as a trusted updater. In an exemplary embodiment, tracking step 812 includes (a) using techniques described in commonly-owned, U.S. patent application Ser. No. 11/969,842, filed Jan. 4, 2008, and (b) monitoring the process tree of the operating system. In an exemplary embodiment, allowing step 214 considers (i) a target object path, (ii) a type of operation being performed, such as allow, deny, and add file to "approved" executables list.

Figure 9:
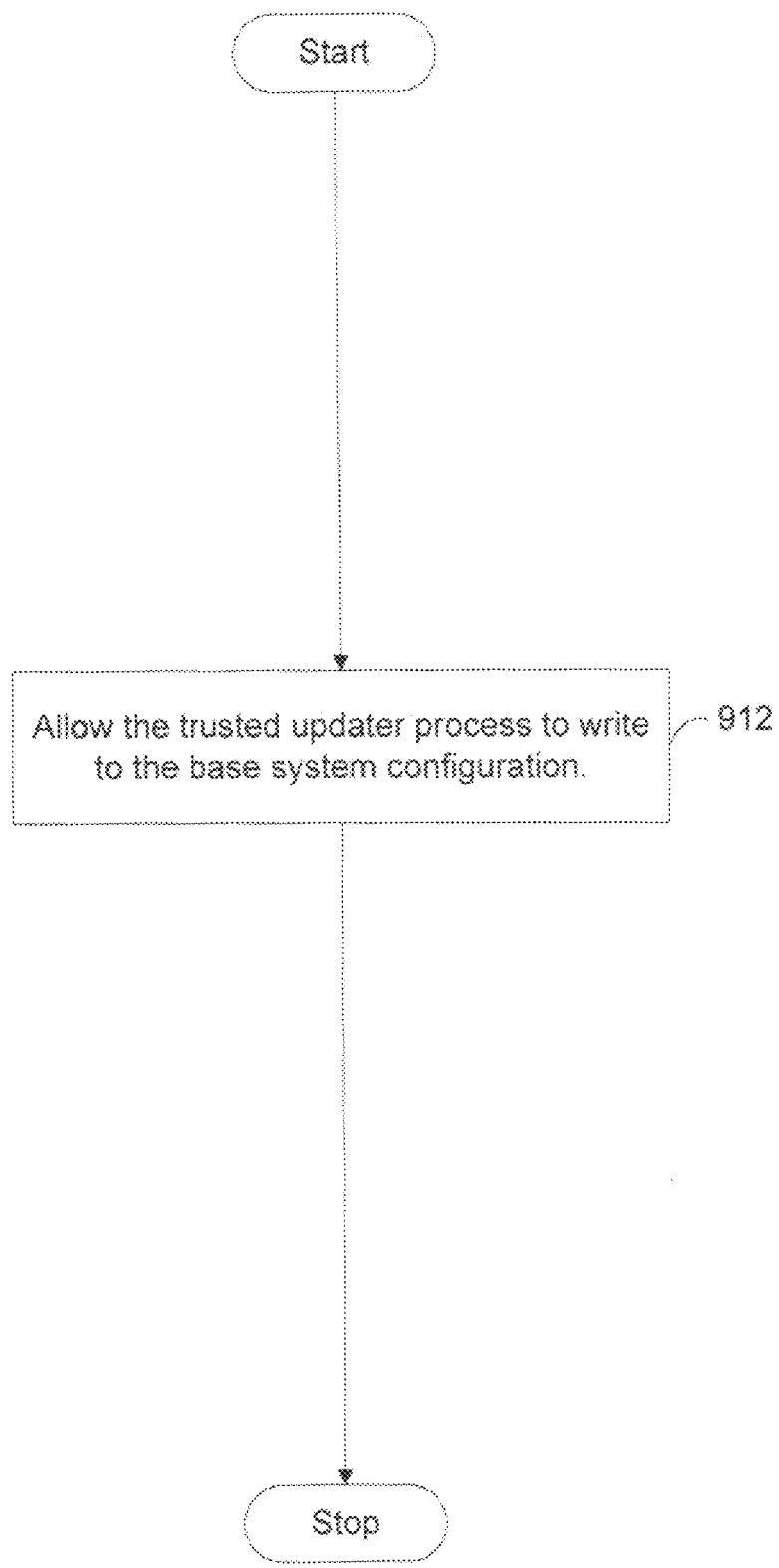
FIG. 9 is a flowchart of the allowing step in accordance with an exemplary embodiment of the present invention.

Referring to FIG. 9, in an exemplary embodiment, allowing step 614 further includes a step 912 of allowing the trusted updater process to write to the base system configuration.

General

The present invention can take the form of an entirely hardware embodiment, an entirely software embodiment, or an embodiment containing both hardware and software elements. In an exemplary embodiment, the present invention is implemented in software, which includes but is not limited to firmware, resident software, and microcode.

Furthermore, the present invention can take the form of a computer program product accessible from a computer-usable or computer-readable medium providing program code for use by or in connection with a computer system or any instruction execution system. The computer program product includes the instructions that implement the method of the present invention. A computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and DVD.

A computer system suitable for storing and/or executing program code includes at least one processor coupled directly or indirectly to memory elements through a system bus. The memory elements include local memory employed during actual execution of the program code, bulk storage, and cache memories that provide temporary storage of at least some program code to reduce the number of times code is retrieved from bulk storage during execution. Input/output (I/O) devices (including but not limited to keyboards, displays, pointing devices, etc.) can be coupled to the computer system either directly or through intervening I/O controllers. Network adapters may also be coupled to the computer system in order to enable the computer system to become coupled to other computer systems or remote printers or storage devices through intervening private or public networks. Modems, cable modems, and Ethernet cards are just a few of the currently available types of network adapters. The computer system can also include an operating system and a compute file-system.

CONCLUSION

Having fully described a preferred embodiment of the invention and various alternatives, those skilled in the art will recognize, given the teachings herein, that numerous alternatives and equivalents exist which do not depart from the invention. It is therefore intended that the invention not be limited by the foregoing description, but only by the appended claims.

What is claimed is:

1. A method of updating an operating system being subject to a strong system lockdown that does not allow changes to a list of approved executables and does not allow changes to a base system's configuration hosting said operating system, the method comprising:
   identifying at least one trusted updater process of the operating system;
   tracking each instance of the trusted updater process and each child-process spawned by the trusted updater process;
   identifying at least one spawned child-process as a trusted updater process based on said tracking; and
   if a trusted updater process attempts to make a change to a list of approved executables of the operating system or to the base system's configuration hosting said operating system, allowing said trusted updater process to make said change; and
   if a non-trusted updater process attempts to make changes to a list of approved executables of the operating system or to the base system's configuration hosting said operating system, denying the non-trusted updater process to make said change.

2. The method of claim 1, further comprising:
   prior to said allowing, validating the identification of the: (i) at least one trusted updater process, and (ii) the spawned child-process.

3. The method of claim 1, wherein a process is identified as a trusted updater process when the executable file of the process is identified as a trusted updater.

4. The method of claim 1, wherein a process is identified as a trusted updater process when the process runs in the local-system account of the operating system.

5. The method of claim 1, wherein a process is identified as a trusted updater process when the process performs a write access from the kernel-mode of said operating system.

6. The method of claim 1, further comprising:
   allowing the at least one trusted updater process to write to at least one of the approved executables.

7. The method of claim 6, further comprising: for each file created by the trusted updater process, adding the file to the list of approved executables when the file is an executable file.

8. The method of claim 1, further comprising:
   allowing the trusted updater process to delete at least one of the approved executables.

9. A system having an operating system being subject to a strong system lockdown that does not allow changes to a list of approved executables and does not allow changes to a base system's configuration hosting said operating system, the system comprising:
   a memory module; and
   a processor in communication with the memory module and that executes a program for updating said operating system, wherein the program:
      identifies at least one trusted updater process of the operating system,
      tracks each instance of the trusted updater process and each child-process spawned by the trusted updater process,
      identifies at least one spawned child-process as a trusted updater based on said tracking, and
      if a trusted updater process attempts to make a change to a list of approved executables of the operating system or to the base system's configuration hosting said operating system, allowing said trusted updater process to make said change, and
      if a non-trusted updater process attempts to make changes to a list of approved executables of the operating system or to the base system's configuration hosting said operating system, denying the non-trusted updater process to make said change.

10. The system of claim 9, wherein said program identifies a process as a trusted updater process when the executable file of the process is identified as a trusted updater.

11. The system of claim 9, wherein said program identifies a process as a trusted updater process when the process runs in the local-system account of the operating system.

12. The system of claim 9, wherein said program identifies a process as a trusted updater process when the process performs a write access from the kernel-mode of said operating system.

13. The system of claim 9, wherein said program:
   prior to said allows, validates the identification of the: (i) at least one trusted updater process, and (ii) the spawned child-process.

14. The system of claim 9, wherein said program further:
   allows the at least one trusted updater process to write to at least one of the approved executables.

15. The system of claim 14, wherein said program further:
   for each file created by the trusted updater process, adds the file to the list of approved executables when the file is an executable file.

16. The method of claim 9, wherein said program further:
   allows the trusted updater process to delete at least one of the approved executables.

17. A computer program product of updating an operating system being subject to a system lockdown that does not allow changes to a list of approved executables and does not allow changes to a base system's configuration hosting said operating system, the computer program product comprising a non-transitory computer-useable storage medium having a computer-readable program, said program when executed on a computer causes the computer to:
   identify at least one trusted updater process of the operating system,
   track each instance of the trusted updater process and each child-process spawned by the trusted updater process
   identify at least one spawned child-process as a trusted updater based on said tracking; and
   if a trusted updater process attempts to make a change to a list of approved executables of the operating system or to the base system's configuration hosting said operating system, allow said trusted updater process to make said change; and
   if a non-trusted updater process attempts to make changes to a list of approved executables of the operating system or to the base system's configuration hosting said operating system, denying the non-trusted updater process to make said change.

18. The computer program product of claim 17, wherein said program when executed on the computer further causes the computer to:

prior to said allow, validate the identification of the: (i) at least one trusted updater process, and (ii) the spawned child-process.

19. The computer program product of claim 17, wherein said program identifies a process as a trusted updater process when the executable file of the process is identified as a trusted updater.

20. The computer program product of claim 17, wherein said program identifies a process as a trusted updater process when the process runs in the local-system account of the operating system.

21. The computer program product of claim 17, wherein said program identifies a process as a trusted updater process when the process performs a write access from the kernel-mode of said operating system.

22. The computer program product of claim 17, wherein said program when executed on the computer further causes the computer to:

prior to said allows, validate the identification of the: (i) at least one trusted updater process, and (ii) the spawned child-process.

23. The computer program product of claim 17, wherein said program when executed on the computer further causes the computer to:

allow the at least one trusted updater process to write to at least one of the approved executables.

24. The computer program product of claim 23, wherein said program when executed on the computer further causes the computer to:

for each file created by the trusted updater process, add the file to the list of approved executables when the file is an executable file.

25. The computer program product of claim 17, wherein said program when executed on the computer further causes the computer to:

allows the trusted updater process to delete at least one of the approved executables.

* * * * *